Dec. 10, 1968    GERALD DE G. COWAN    3,415,110
ULTRASONIC INSPECTION

Filed July 31, 1964    6 Sheets-Sheet 1

INVENTOR.
Gerald de G. Cowan
BY Wooster, Davis & Cifelli
ATTORNEYS.

Dec. 10, 1968    GERALD DE G. COWAN    3,415,110
ULTRASONIC INSPECTION

Filed July 31, 1964    6 Sheets-Sheet 3

INVENTOR.
Gerald de G. Cowan
BY
Wooster, Davis & Cifelli
ATTORNEYS.

INVENTOR.
Gerald de G. Cowan
BY Wooster, Davis & Cifelli
ATTORNEYS.

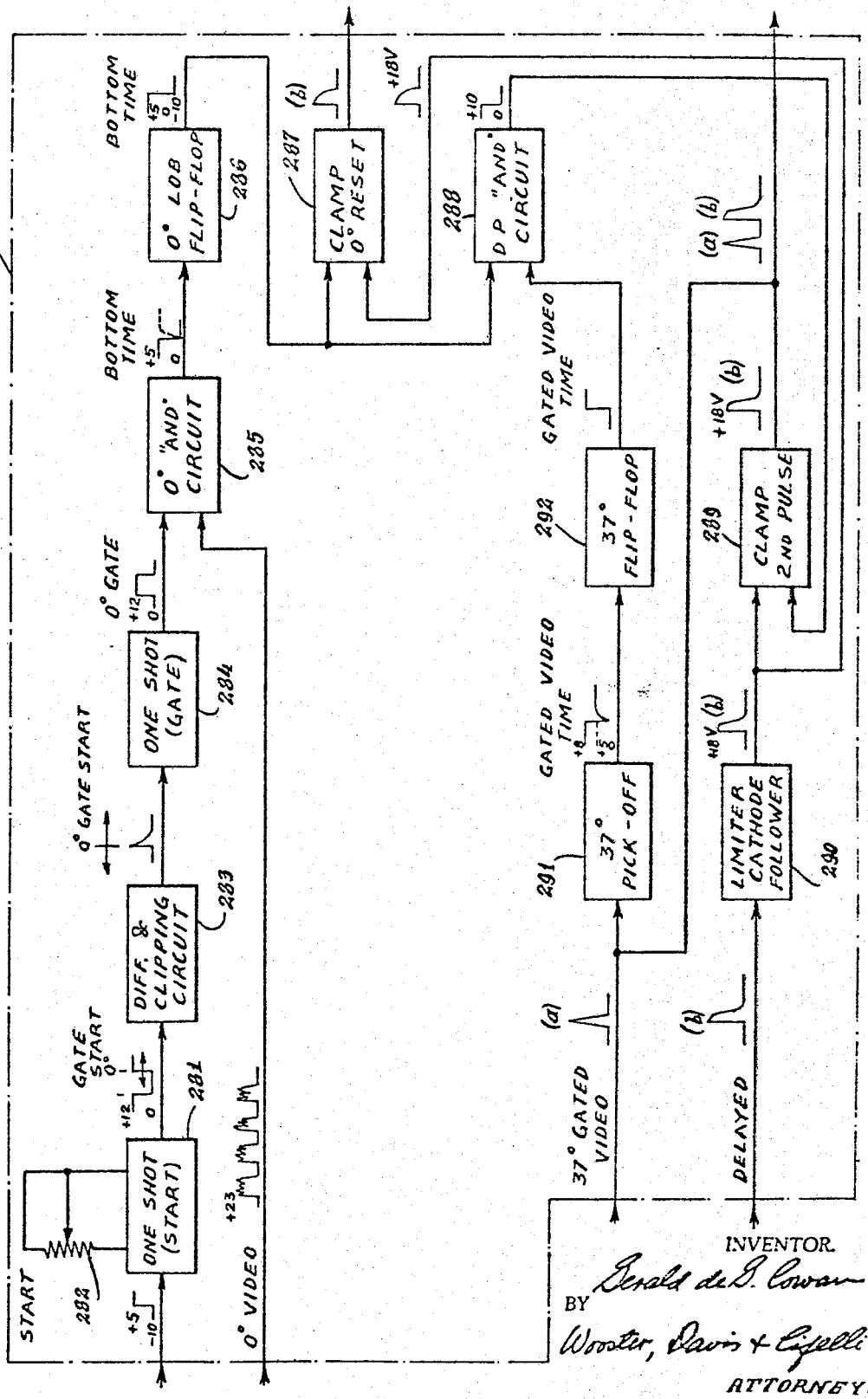

_United States Patent Office_

3,415,110
Patented Dec. 10, 1968

3,415,110
ULTRASONIC INSPECTION
Gerald De G. Cowan, New Preston, Conn., assignor, by mesne assignments, to Automation Industries, Inc., El Segundo, Calif., a corporation of California
Filed July 31, 1964, Ser. No. 386,534
25 Claims. (Cl. 73—67.8)

ABSTRACT OF THE DISCLOSURE

This invention relates to the inspecting of materials such as railroad rails at high rates of speed with little or no operator interpretation. The system utilizes a plurality of differently orientated beams of ultrasonic energy which simultaneously probe different regions of the workpiece. The ultrasonic energy is transmitted in pulses and the characteristics of any targets are determined by counting the number of returning echoes. The characteristics of the target may then be identified by determining the accumulated counts. From this a decision can be made as to whether or not the target is an acceptable one or an objectionable defect. In addition several different types of logic are incorporated into the system whereby the response characteristics of the system are adjusted to correlate with the types of target being inspected so an intelligent decision can be automatically made as to the type of target and whether or not it is an objectionable defect.

---

This invention relates to ultrasonic inspection of solid materials and, more particularly, to high speed inspection of rails in track.

The inspection of solid materials by means of the ultrasonic pulse echo reflection technique is widely known and applied in inspection systems. A suitable electromechanical transducer, such as a piezoelectric crystal, is energized by a short electrical pulse of radio frequency. The crystal is thereupon caused to vibrate, producing a mechanical wave of ultrasonic frequency which is passed into the material to be inspected. Any discontinuity within the test object reflects the mechanical wave. This echo signal is received by the same or a different transducer which thereupon generates an electrical echo signal. Proper gating, counting, and timing circuits are then employed to evaluate the size of the defect, its location, and various other factors.

When testing rails in track by an ultrasonic system, it is customary to couple the transducers to the rail by means of a wheel search unit. A wheel search unit is basically a liquid filled rubber tire which rolls along the surface of the rail and contains the necessary transducers, thus presenting a liquid path from the transducers to the surface of the rail. It will, of course, be obvious that one of the ultimate objectives in rail testing is to test rails completely automatically and at relatively high speeds. However, these objectives have not been achieved with present rail testing systems for a number of reasons. One of the major reasons lies in the fact that railroad rails have a number of ultrasonic discontinuities which are not caused by flaws. These discontinuities, for example, may include various track structures, track connections, and bolt holes through the web of the rail. It will also be apparent that the running surface of the rail which is used to couple the ultrasonic energy into the interior of the rail also presents a number of variables such as wear, grease, rust, and foreign objects on the rail surface. When using present automatic systems, these various factors often create false alarms. Accordingly, the operator of a test car is often required to stop and verify the alarm by means of visual inspection or hand testing. In order to overcome certain of these problems, namely, the problem of signals received from bolt holes, gating circuits have been employed for removing the bolt hole portion of the web from the inspected portion of the rail. Although this approach has been partially successful in that it has reduced the number of false alarms, it has also reduced the effectiveness of the ultrasonic system to locate and find defects. This is because the gates are established using the initial energization of the tranducer as a reference. If the gate were set at optimum timing, first and second interface signals or bolt hole signals would come into the gate as the wheel flat changes. To prevent this, the size of the gate must be reduced. In so doing, the test volume is also reduced. In the case of head and web separations, it is very probable that indications from such a defect would be gated out completely when testing on light weight rail.

Evaluating the size of defects has also been a problem. One method heretofore employed has been to integrate the received pulses and alarm upon reaching some predetermined integration level. With this approach, however, small amplitude signals were "weighted" less than high amplitude signals. Accordingly, a defect producing weak signals had to be much longer than a defect producing strong signals in order to actuate an alarm.

Still another problem resides in the speed at which tests may be conducted. With many existing systems, tests must be run at a constant known speed. This is because the pulses to the transducer are generated at specific intervals which correspond to fixed distances along the rail. If the speed of the car is too fast, it is possible that many defects would be completely missed. However, it would be desirable to be able to operate over a range of speeds from approximately two to fifteen miles per hour, as traffic or other operating limitations often make it difficult to maintain a fixed speed.

Accordingly, it is a primary object of the present invention to provide an improved ultrasonic testing system. Other objects are to provide such a system which is particularly adapted to the testing of rails in track; which is capable of high speed testing; which is capable of completely automatic operation; which is capable of distinguishing between defects of various locations and sizes; which is capable of utilizing decimal type counters; which is capable of use at various testing speeds; and which is substantially unaffected by rail surface conditions. Other objects, features and advantages will be apparent from the following description, the appended claims, and the figures of the attached drawings, wherein:

FIGS. 1, 2, and 3 are a block diagram of an ultrasonic rail inspection system in accordance with this invention;

FIG. 4 is an illustration showing the manner in which

FIG. 11 is a block diagram of still another element of the circuit of FIGS. 1–3.

Before proceeding to a detailed description of the system of this invention, it may be briefly described as consisting of two ultrasonic wheel search units positioned over each rail, each search unit enclosing three transducers. The ultrasonic energy which is emitted and received by these transducers is processed through proper amplifiers, gate amplifiers, and correction circuits and may be combined in a counter alarm system. The counter alarm system resolves this information into three channels, a forward 37° channel, a rear 37° channel, and a 0° channel. The purpose of each channel is to count pulses from direct reflections or to count the loss of reflections so as to alarm upon a discontinuity of preset length and, also, to reset itself after receiving signals indicating non-dangerous discontinuities. Each alarm is then recorded on another counter tube so that the resulting three channels provide an operator with information as to the size and type of defect.

In order to make the system usable at varying speeds, the pulse generator which energizes the transducers is controlled by a tachometer generator responsive to the speed of the test car.

In order to compensate for changes in the rail contour, all gates are started at the surface of the rail by means of the first interface signal which returns from the transducer. Accordingly, as the wheel flat varies, depending on rail conditions, the start of the test time will change in relationship to the time that the pulse is initiated by the pulse generator.

In order to compensate for variables introduced by surface conditions, which vary the ultrasonic coupling, the gain of the system is varied in accordance with the rail noise received. "Rail noise" may be defined as small echo signals originating in the granular structure of the steel. Such gain control automatically corrects for any loss in coupling which may be experienced due to grease or other surface variables.

For a more particular description of the system of this invention, reference will now be made to the diagram of FIGS. 1–3.

Figure 2:
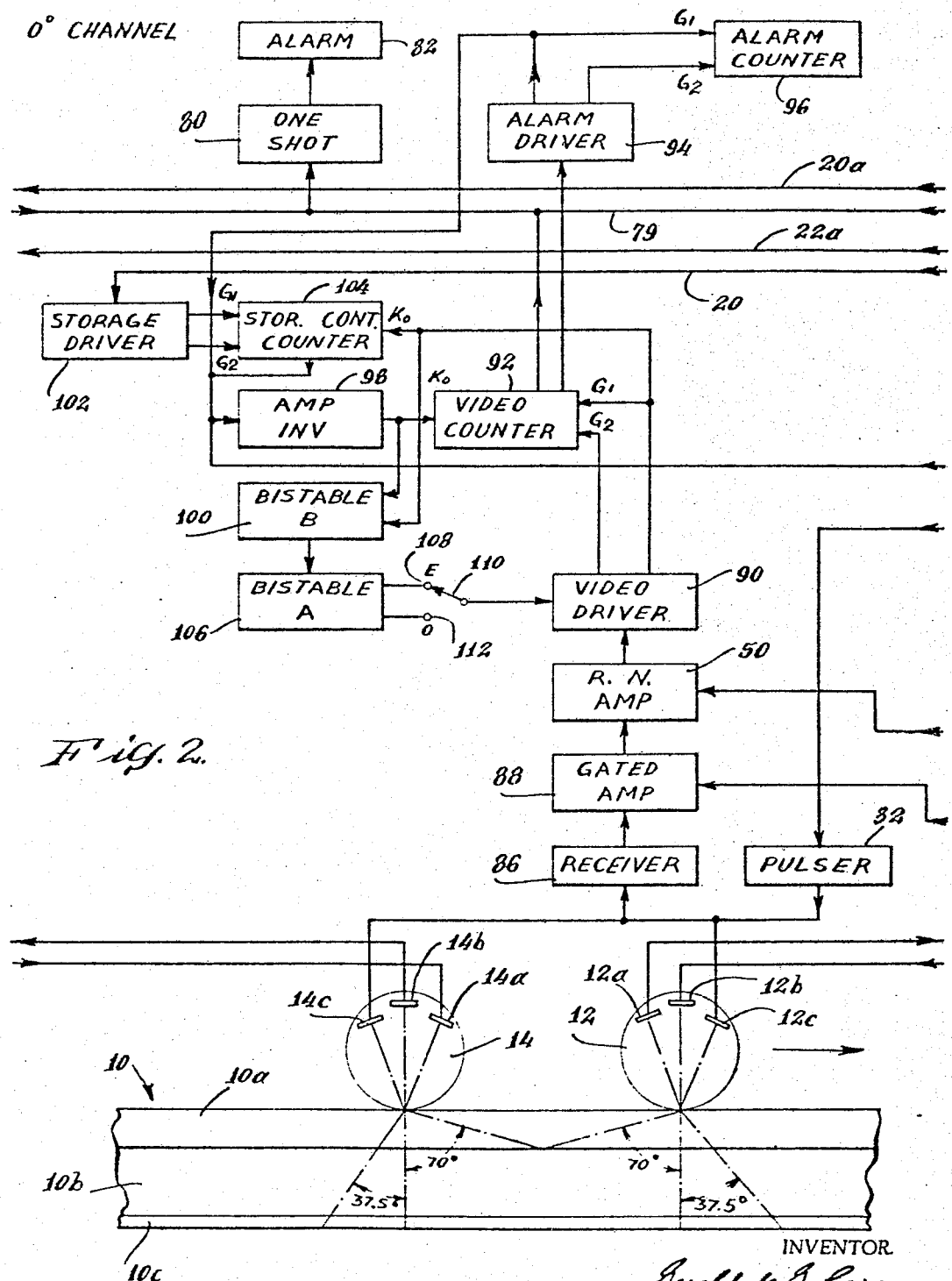

In FIG. 2 there is illustrated a section of a railroad rail 10, including a head portion 10a, a web portion 10b, and a base portion 10c. A forward wheel search unit 12 and a rear wheel search unit 14 are suspended by suitable means (not shown) from an inspection car so as to roll along the upper surface of rail 10 in the direction indicated by the arrow. Wheel search unit 12 encloses three transducers or crystals, a forward 37° crystal 12a which directs ultrasonic energy into the rail 10 in a direction corresponding to the direction of movement of the car and at an angle of 37½° from the vertical in steel, a 0° crystal 12b which directs ultrasonic energy into the rail normal to its upper surface, and a 70° crystal 12c which directs energy through the head of the rail in a direction opposite to the direction of movement of the car at an angle of 70° to the normal in steel. Wheel search unit 14 is supplied with similar crystals, namely, a rear 37° crystal 14a, a 0° crystal 14b, and a 70° crystal 14c. The spacing of the wheel search units 12 and 14 is such that the paths of the 70° ultrasonic energy from the two wheels meet at the intersection of the head 10a and the web 10b.

Figure 3:
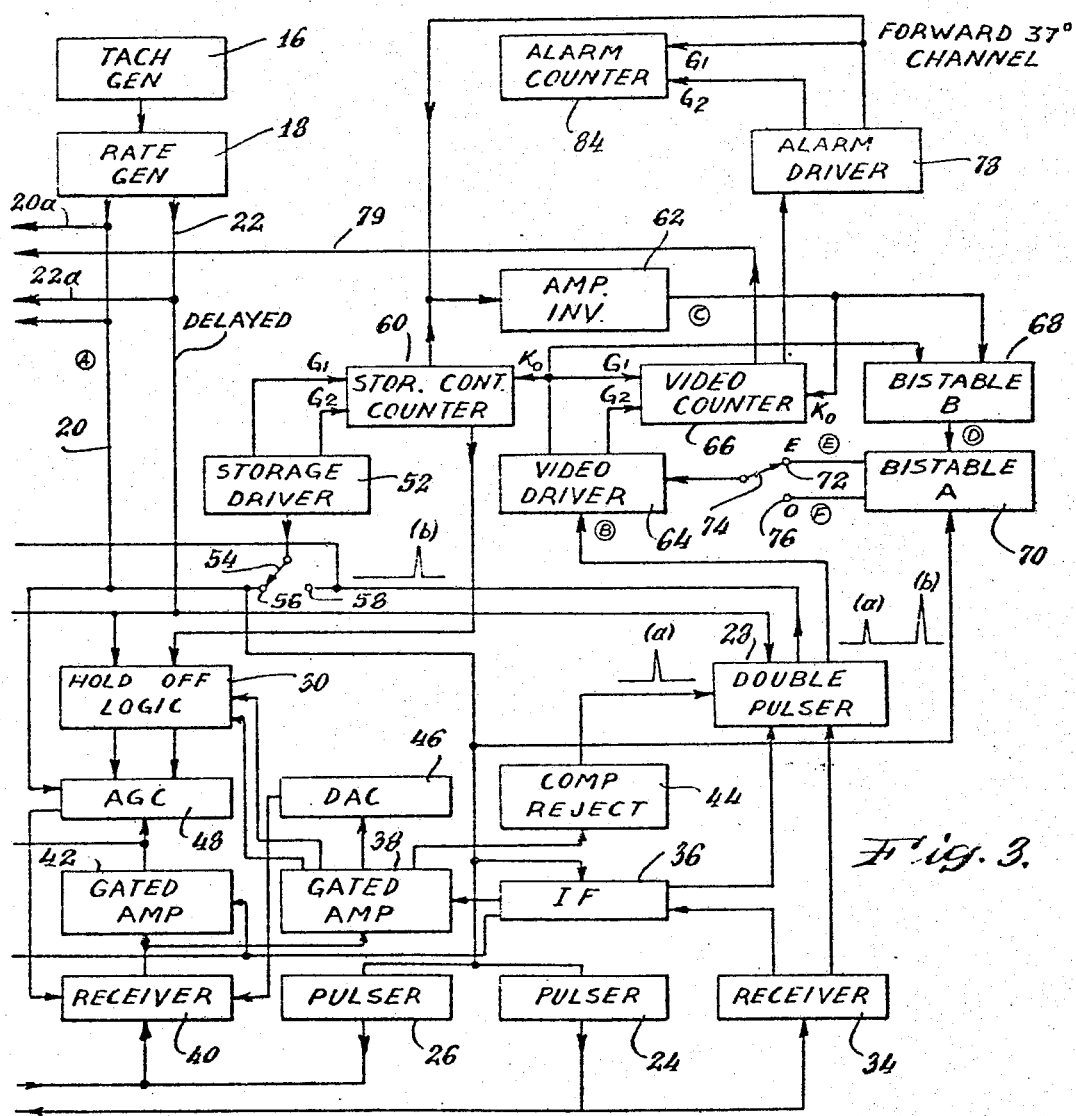

Referring now to FIG. 3, it will be noted that a tachometer generator 16, which is controlled by the speed of the detector car, operates a rate generator 18 which produces main timing signals at an output line 20 and delayed timing signals at an output line 22. The main timing signals from output line 20 are connected to energize a pulser 24 which generates a radio frequency pulse to the 0° crystal 12b in forward wheel search unit 12. The main timing signals from output line 20 are also received by pulser 26, which is similarly connected to the forward 37° crystal 12a in wheel search unit 12. The main timing signals from rate generator 18 are also applied to the 0° channel of FIG. 2 by line 20 and to the rear 37° channel illustrated in FIG. 1 by line 20a. It will be obvious from a comparison of FIGS. 1 and 3, that the circuits of the forward and rear 37° channels are very similar. For this reason, the circuit of FIG. 1 will not be specifically described but the reference numerals employed to designate the various elements of the circuit will be similar to those employed in describing the forward 37° channel of FIG. 3 with a prime attached. Thus it will be noted that the main timing signals from output line 20 are supplied via line 20a to pulser 24' which energizes 0° crystal 14b in wheel search unit 14 and to pulser 26' which energizes the rear 37° crystal 14a in wheel search unit 14.

Referring back to FIG. 3, it will be noted that the delayed timing signals from output line 22 are supplied to the double pulser circuit 28, to the hold-off logic circuit 30, and to the pulser 32 shown in FIG. 2 which energizes 70° crystals 12c and 14c in the respective wheel search units. The delayed timing signals are also supplied over line 22a to double pulser 28' and hold-off logic circuit 30' of the rear 37° channel shown in FIG. 1.

A receiver 34 is connected to receive the output signal from crystal 12b. Receiver 34 has two outputs, one being supplied to the double pulser circuit 28, the other being supplied to an interface gating circuit 36.

The interface gating circuit 36 also receives an input from the output line 20 and provides gating signals to gated amplifiers 38, 42, and 88, and a signal to double pulser 28. A receiver 40 is connected to receive the output echo signals from crystal 12a, and its output supplies the gated amplifier 42 and the gated amplifier 38. The output of gated amplifier 38 supplies the compensated reject circuit 44, the distance amplitude correction circuit 46, and the hold-off logic circuit 30. The output of distance amplitude correction circuit 46 is supplied to the receiver 40 where it serves to adjust the gain of the receiver to compensate for signal attenuation which occurs with increased depth of inspection in the steel rail. A circuit of this type is well known in the art and is disclosed, for example, in U.S. Patent 3,033,029 which issued May 8, 1962, to F. G. Weighart. The output of the gated amplifier 42 is supplied to an automatic gain control circuit 48 and also to a rail noise amplifier 50 which is a part of the 0° channel shown on FIG. 2. It will be noted that this connection is a departure from the circuit of the rear 37° channel shown in FIG. 1. In FIG. 1, the gated amplifier 42' supplies only the automatic gain control circuit 48'.

A number of counters are employed in the circuitry of this invention. Although any suitable type of counter could be employed, the presently described system utilizes decade counter tubes of the cold cathode type having ten individual cathodes to permit multiple or sequential output pulses. One such tube which may be used for this purpose is the Sylvania CT4251. A counter tube may be visualized as containing a series of small neon glow lamps which are sequentially energized by a pair of out of phase triggering pulses G1 and G2. These triggering pulses are provided by a driver circuit which is also well-known in the art. As the tube counts, the glow moves from one cathode to the next and output pulses can be derived from any preselected cathode when it becomes energized. In addition, the counter tube can be reset by means of a $K_0$ pulse.

Referring back to the circuit of FIG. 3, it will be noted that a storage driver circuit 52 is energized through a switch 54 which can be connected to a terminal 56 or a terminal 58. When switch 54 is connected to terminal 56 as shown, the storage driver 52 is energized by the main timing signals from output line 20. When connected to terminal 58, it may be energized from the second or delayed pulse (b) from double pulser circuit 28. Storage driver 52 supplies the G1 and G2 inputs to the storage control counter 60. The output from one cathode of the storage control counter is connected to amplifier-inverter circuit 62. The output from the same or a different cathode is supplied to the hold-off logic circuit 30. A video driver circuit 64 is energized from the double pulser circuit 28 and energizes video counter 66. In addition, the G1 signal from video driver 64 serves as the $K_0$, or resetting, signal to the storage control counter 60 and is also one of the triggering inputs to a bistable multivibrator circuit referred to as bistable B68. The output from amplifier inverter 62 supplies both the resetting signal $K_0$ to video counter 66 and a second triggering impulse to bistable B68. The output of bistable B68 provides one of the triggering impulses to a second bistable multivibrator known as bistable A70. The other trigger input to bistable A70 is derived from the main timing signals of output line 20. The output of bistable A is in the form of two out-of-phase square waves, one output, known as the "evens" output, is supplied to terminal 72 of a selector switch 74. The other output, "odds," is supplied to terminal 76 of switch 74. The output from one of the counting cathodes of video counter 66 is supplied to the alarm driver 78. An output from the same or a different cathode is supplied via line 79 to a one shot multivibrator 80 (FIG. 2) which, in turn, is connected to energize an alarm 82. The G1, G2 outputs of alarm driver 78 energize an alarm counter 84. In addition, the G1 output also feeds back to the input to amplifier-inverter 62.

The circuit of the 0° channel is somewhat different from the circuitry of either the forward 37° channel or the rear 37° channel. Reference to FIG. 2 will disclose that the pulser 32 of the 0° channel is connected to energize the two 70° crystals 12c, 14c. The echoes from these crystals are conveyed to receiver 86 and are then passed through gated amplifier 88 and rail noise amplifier 50 to the video driver circuit 90. The G1 and G2 outputs from the video driver 90 are connected to energize the video counter 92. One of the counting cathodes of video counter 92 is connected to the one shot multivibrator 80 and the same or a different cathode energizes the alarm driver 94 whose G1 and G2 outputs activate the alarm counter 96. The G1 output from alarm driver 94 and an output from double pulser 28 are also fed back to the amplifier-inverter 98 of the 0° channel which provides a resetting signal $K_0$ to the video counter 92 and also provides one input to a bistable multivibrator, bistable B100. A storage driver 102 is energized by the main timing signals from rate generator 18 over line 20 so as to provide G1, G2 signals to a storage control counter 104. The reset signal $K_0$ to the storage control counter 104 is derived from the G1 signal produced by video driver 90, and this same signal is the second input to the bistable B multivibrator 100. One of the counting cathodes of storage control counter 104 is also connected to supply an input to the amplifier inverter 98. The output of bistable B circuit 100 serves as a triggering input to bistable A multivibrator 106. Bistable A circuit 106 supplies two out of phase square waves, one to terminal 108 of a selector switch 110, the other to a terminal 112 of the same selector switch. The selector switch in turn provides an additional input to video driver 90.

Figure 6:
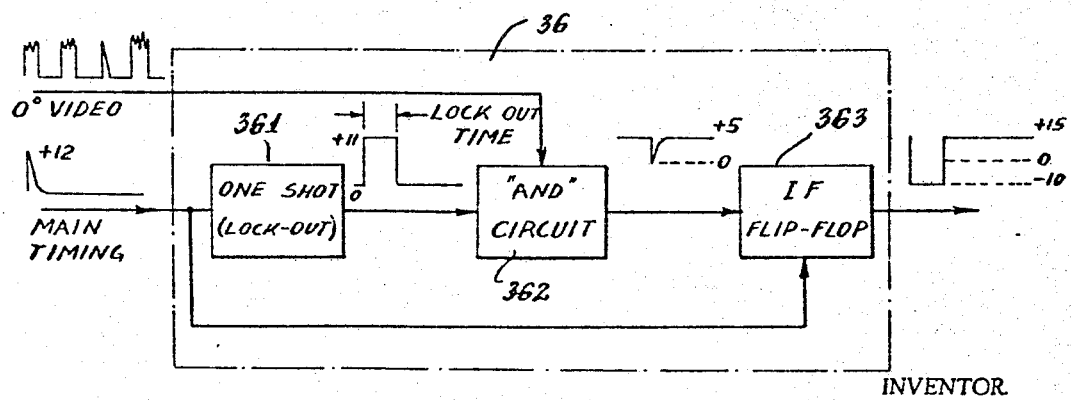
FIG. 6 is a block diagram of one of the elements of the circuit of FIGS. 1–3.

The circuitry of the interface gate 36 (and the similar gate 36′) is illustrated in FIG. 6. The interface circuit will be seen to include a one shot multivibrator 361, an "And" circuit 362, and a flip-flop 363. The main timing signals from the rate generator 18 are supplied to the one shot multivibrator 361 and also to the flip-flop 363. And circuit 362 receives the output from the one shot multivibrator and also receives signals from receiver 34.

The flip-flop 363 receives the output from And circuit 362, as well as the main timing signals, and provides the output to the gated amplifiers.

Figure 7:
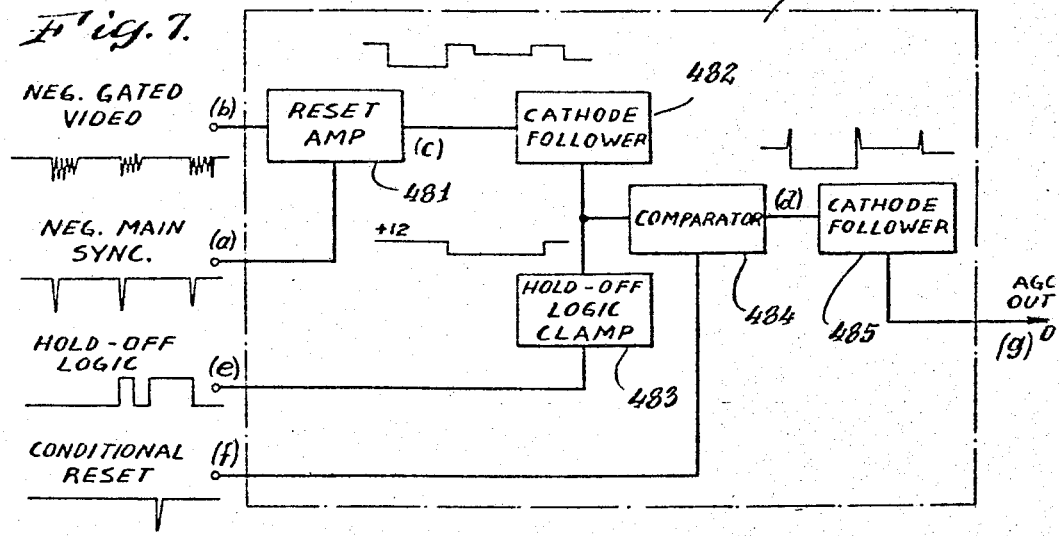
FIG. 7 is a block diagram of still another element of the circuit of FIGS. 1–3.
Figure 8:
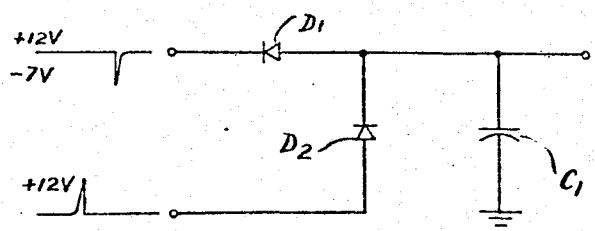
FIG. 8 is a diagram of the circuit employed in portions of the circuit of FIG. 7.

The diagram for the automatic gain control circuits 48, 48′ is illustrated in FIG. 7. The elements of these circuits are seen to include a reset amplifier 481, a cathode follower 482, a hold-off logic clamp 483, a comparator circuit 484, and a cathode follower 485. The reset amplifier 481 and the comparator 484 utilize similar circuitry, which is illustrated in FIG. 8. This circuit comprises diodes D1 and D2 connected in reversed polarity as shown. Their common output is the output of the circuit and is also connected to a grounding capacitor C1. It will be seen that the input to the reset amplifier 481 comprises the negative gated video signals (b) from the gated amplifier 42 and negative main timing signals (a) from rate generator 18. The output (c) of the reset amplifier 481 is conducted through the cathode follower 482 to the comparator circuit 484. The inputs to the hold-off logic clamp 483 (e) and to the comparator 484 (f) are both derived from the hold-off logic circuit 30. The output (d) of comparator 484 is supplied to cathode follower B485 which provides the output (g) from the amplifier gain control circuit 48 to the receiver 40.

The operation of this invention will now be described by discussing the operation of the various components of the circuitry and the manner in which they are interrelated.

In the following description, a certain basic familiarity with prior art ultrasonic pulse echo inspection systems will be assumed. Basically, however, it may be said that each ultrasonic crystal is periodically pulsed by its associated pulser. The echo signal which is received by the crystal is transformed into an electrical signal which is detected by the receiver and passed through a suitably gated amplifier. Echo signals which are so gated are referred to in the art as "video signals" and this term will be employed herein.

Forward 37° channel

The rate generator 18 is controlled directly by the tachometer generator 16 so that it produces output pulses at a rate directly proportional to the speed of the car. This rate varies, for example, from 500 pulses per second at 6.5 m.p.h. to 1000 pulses per second at 13 m.p.h. The pulses produced by the rate generator 18 feed directly into the storage driver 52 which produces the out-of-phase G1 and G2 signals for actuating the storage control counter 60. It will be seen that the storage control counter 60 will count each pulse received from the rate generator 18. When the count on the storage control counter 60 reaches a predetermined level, it produces an output signal which is applied to the amplifier-inverter 62. In the disclosed embodiment, the second cathode of the storage control counter 60 is the pickoff cathode. Then, in the absence of video signals, a signal would be applied to the amplifier-inverter 62 upon receipt of every tenth pulse from the rate generator 18. However, when video pulses are received by the video driver 64, it produces the G1 and G2 signals required to operate the video counter 66. The video counter 66 will thus advance to its preselected pickoff cathode and will thereupon send a signal to the alarm driver 78 and to the alarm one shot multivibrator 80. The one shot multivibrator 80 actuates the alarm 82 and the alarm driver 78 produces the G1 and G2 signals required to actuate the alarm counter 84. In addition to actuating the alarm counter 84, the G1 signal from the alarm driver 78 is fed back to the amplifier-inverter 62 which thereupon sends a reset pulse $K_0$ to the video counter 66, thereby resetting it. This sequence will then repeat itself as long as video signals continue to arrive at the video driver 64.

The foregoing has described the operation of the forward 37° channel both in the condition when no video signals are being received and when video signals are being received continuously. Let us now consider the operation of the circuit when intermittent video signals are being received by the video driver 64. We will first assume that the storage control counter 60 is running normally and counting each pulse from the rate generator 18 and that three successive video pulses are received by the video driver 64. Upon receipt of the first video pulse, the storage control counter 60 will be reset and the video counter 66 will count one pulse. On receipt of the next pulse from the rate generator 18, the storage control counter 60 will count "1." However, the following video signal will reset the storage control counter 60 and advance the video counter 66 to "2." The same thing will happen on the third pulse from the rate generator 18 and receipt of the third video signal so that the storage control counter 60 is reset once again and the video counter 66 advances to "3." On the fourth pulse from the rate generator 18, however, the storage control counter 60 will advance to "1" and this count will not be erased since no video signal arrives at the video driver 64 to reset it. With each succeeding pulse from the rate generator 18, the storage control counter 60 counts one more until it reaches the pickoff cathode. When this count is reached, a signal is passed to the amplifier-inverter 62 which resets the video counter 66 to "0." Thus storage control counter 60 establishes the length of time the video counter 66 "remembers" receipt of a video signal.

It will be seen that there are two methods for resetting the video counter 66 of the forward 37° channel which have been thus far explained: (1) The video counter is reset whenever the count on the storage control counter 60 reaches the preselected pickoff cathode; (2) The video counter is reset whenever the alarm counter 84 is actuated.

One of the objectives of this invention is to make it possible to utilize decimal type counters, while discriminating between defects large enough to return more than ten echo pulses. This is accomplished by the bistable circuitry of the invention. A bistable multivibrator 70, known as "bistable A," is energized by the rate generator 18 so that each main timing pulse produced by the rate generator causes a change in state of the bistable A output. It will be apparent that the square wave output from a bistable multivibrator triggered in this fashion will have one-half the frequency of the rate generator output. In other words, two pulses from the rate generator 18 will be required in order to cause the output of bistable A multivibrator 70 to pass through one complete cycle from positive to negative (or vice versa). The bistable A multivibrator 70 is designed to produce two output square waves, 180° out of phase. These outputs are referred to herein as the "odd" and "even" outputs and are applied, respectively, to the "odd" terminal 76, and the "even" terminal 72 of the selector switch 74 which, in turn, feeds the video driver 64. With the selector switch 74 positioned on the "even" terminal 72, as illustrated, it will be apparent that the input to the video driver 64 will be positive during alternate main timing pulse periods.

The circuit of video driver 64 is designed in such a fashion that a G2 output to the video counter 66 will be produced only while a positive signal is being introduced to the video driver from bistable A multivibrator 70. Accordingly, in the absence of any further circuitry, the video counter 66 would only count pulses which occur during the positive portions of either the "odd" or "even" outputs (depending on the setting of switch 74) from bistable A multivibrator 70. It will be noted, however, that a second bistable multivibrator 68, denoted "bistable B," is included in the circuit. The inputs to the bistable B multivibrator 68 are the G1 signal, which is applied to the video counter 66, and the output signal $K_0$ from the amplifier-inverter 62. It will be remembered that pulse $K_0$ is supplied by the amplifier inverter 62 for terminating a counting sequence of video counter 66.

Figure 5:
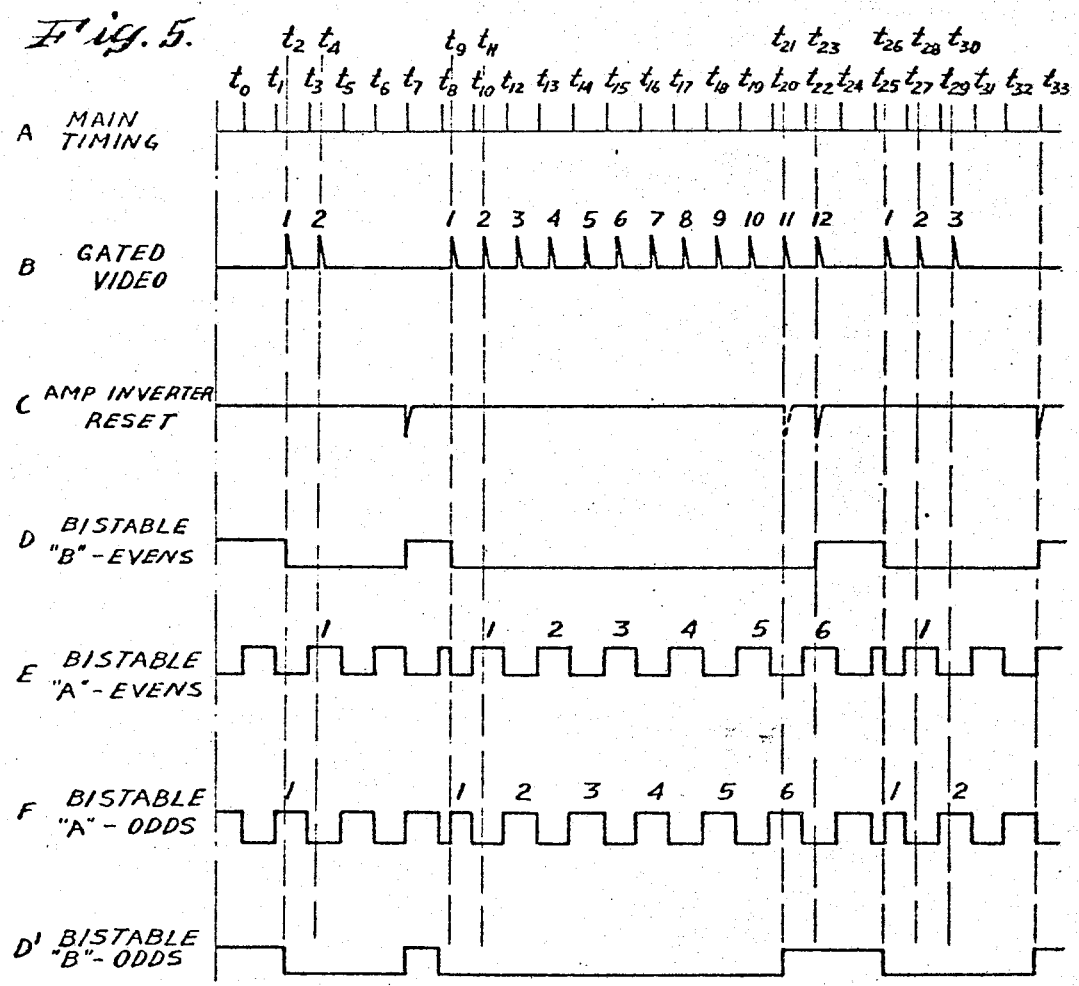
FIG. 5 is a diagram illustrating the electrical signals at various portions of the circuit of FIGS. 1–3.

The operation of the bistable circuitry of the invention may be best understood by additional reference to FIG. 5, which illustrates the timing of the various signals produced. The letters at the left of the diagram refer to the points indicated by circled letters on the block diagram of FIG. 3. The times at which various events occur are indicated by the letters "$t_0$"–"$t_{33}$." In the following explanation, it is assumed that the output switch of the storage control counter 60 is set at the third cathode and that the alarm output from the video counter 66 is set at the sixth cathode. It is also assumed that the selector switch 74 between the video driver 64 and the bistable multivibrator 70 is set at "evens" terminal 72.

With the foregoing assumptions, it will be noted that the first two main timing pulses from the rate generator 18 at times $t_0$ and $t_1$, will cause first a positive and then a negative deflection of the output of multivibrator 70. At time $t_2$ a gated video signal is received by the video driver 64. However, since the output of bistable A multivibrator 70 is negative at this time, the video driver 64 produces no G2 signal and is thus prevented from driving the video counter 66. Accordingly, this pulse is not counted by the video counter. However, a G1 output does result from the video driver 64 which resets the storage control counter 60 and also activates the bistable B multivibrator 68 into its negative state. At time $t_3$ the main timing pulse from rate generator 18 causes the bistable A output to become positive once again and at time $t_4$ the second gated video signal is received by the video driver 64. When this second signal is received, the output of bistable A multivibrator 70 is positive so that a G2 signal is generated by the video driver 64 and the video counter 66 is caused to advance one cathode, thereby counting the video pulse as indicated by the numeral "1" on diagram E. At the same time, the G1 signal from the video driver 64 resets the storage control counter 60.

It is now assumed that no further video signals are received. Accordingly, the count of the storage control counter 60 advances until the output cathode is reached at time $t_7$, which thereupon applies a signal to the amplifier-inverter 62. The output from the amplifier-inverter 62 resets the video counter 66 and causes bistable B multivibrator 68 to revert to its original state.

At time $t_8$, the main timing signal from rate generator 18 causes the output of bistable A multivibrator 70 to become positive in the usual fashion. Shortly thereafter, at time $t_9$, a gated video signal is received by the video driver 64.

Since the video pulse received at time $t_9$ is the first of a new series of echo pulses, it is odd numbered. Accordingly, since selector switch 74 is on "evens," neither it nor the other odd numbered pulses should be counted. The video counter 66 should be responsive only to the even numbered pulses. The output of bistable A multivibrator 70, however, is now positive so that this first pulse would normally be counted. In order to prevent this, the output of the bistable A multivibrator 70 is reversed. This is accomplished by the G1 signal from the video driver 64 to the bistable B multivibrator 68 which causes bistable B to change state. This change of state triggers bistable A multivibrator 70 causing an inversion of its square wave output. Since the G2 pulse from the video driver 64 would be produced approximately fifty microseconds after the G1 pulse, the state of the bistable A output would then be such as to prevent the G2 pulse from being passed to the video counter 66. Accordingly, the video counter 66 will not count this first of the new series of video pulses.

It will be noted that the output of bistable A multivibrator 70 is now polarized for generating a positive signal during the occurrence of the even numbered video pulses in the new series. Accordingly, the second pulse, occurring at time $t_{11}$, is counted, as is each succeeding even numbered pulse. The video counter 66 continues to count every other pulse until the video counter output cathode is reached at time $t_{23}$, which represents the sixth counted pulse. When this level of the video count is reached, an impulse is produced which energizes the one shot multivibrator 80 and actuates the alarm 82. Simultaneously, the alarm driver 78 is actuated, producing G1 and G2 signals to energize the alarm counter 84. In addition, the G1 signal from the alarm driver 78 passes to the amplifier inverter 62.

When the amplifier inverter 62 is energized, it produces a pulse which activates the bistable B multivibrator 68 into its positive condition. The same output from the amplifier inverter resets the video counter 66. The output of bistable A multivibrator 70 continues to alternate in the same sequence under the influence of the rate generator 18 output until another video signal is received at time $t_{26}$. This signal once again activates the bistable B multivibrator 68 to its negative state and inverts the square wave output from bistable A multivibrator 70 so that the second video pulse at time $t_{28}$ is counted. Since the video pulse at time $t_{30}$ is an odd numbered pulse, it is not counted, although it does serve to reset the storage control counter 60. This short three pulse series thereupon terminates and three more rate generator pulses to the storage control counter 60 cause the video counter 66 to be reset once more and the bistable B multivibrator 68 to revert to its positive state.

The above description has explained the operation of the bistable circuitry for the "even" position of the selector switch 74. Very similar results occur when the switch is in the "odd" position at terminal 76. It will be remembered that the "odd" output of bistable A multivibrator 70 is 180° out of phase with the "even" output. Accordingly, the first and subsequent odd numbered video pulses in each sequence would then be counted rather than the even numbered pulses. The result is to cause the alarm 82 to be actuated one count earlier than when the selector switch 74 is in the "even" position. This is illustrated by the alarm pulse shown in diagram C at time $t_{21}$. Diagram D' illustrates the inversion of the bistable B "odd" output produced by the signal from the amplifier inverter 62.

Rear 37° channel

Figure 1:
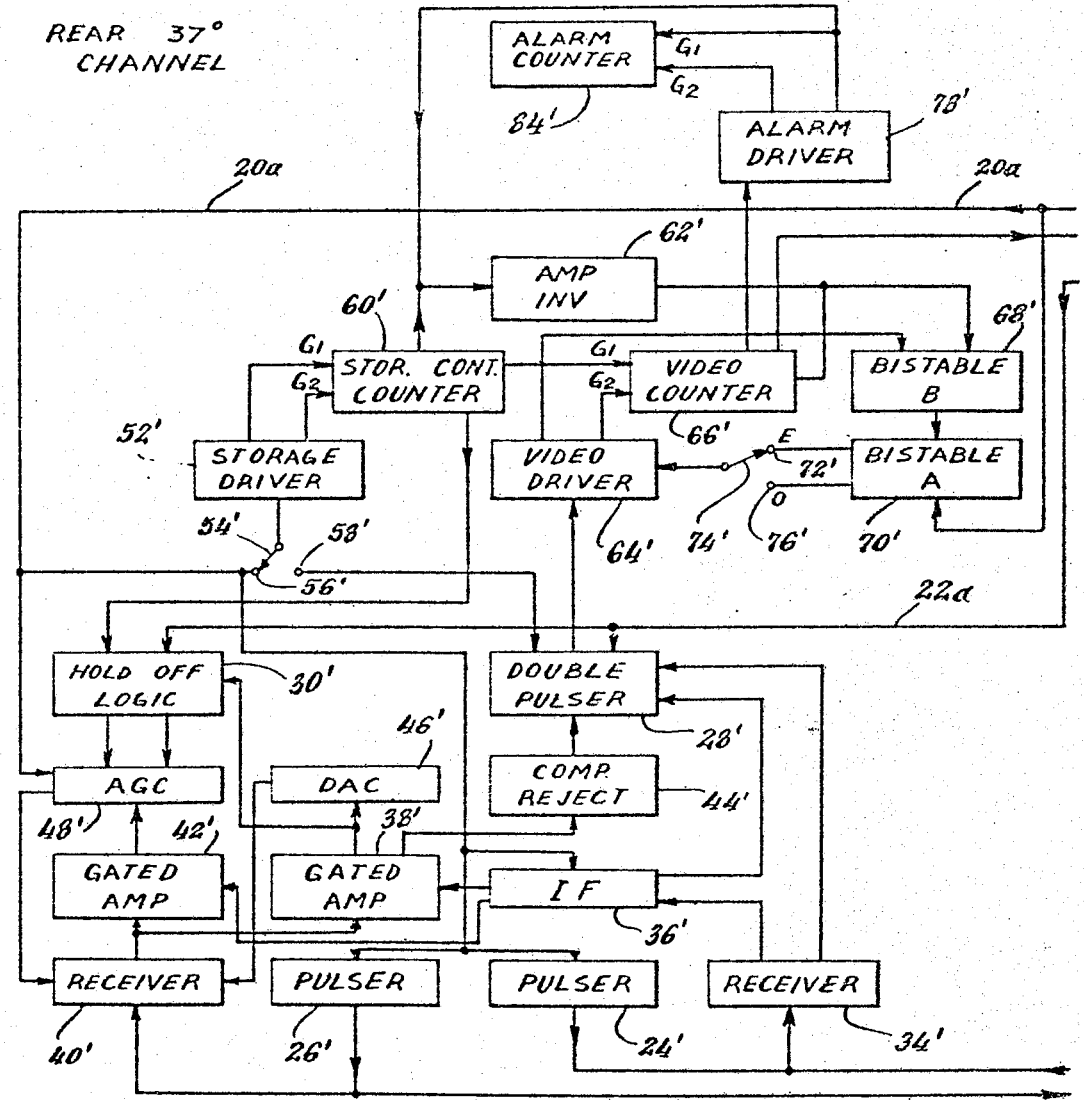
FIGS. 1, 2, and 3 are interrelated.
Figure 4:
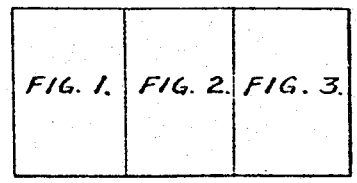

The rear 37° channel of FIG. 1 is identical with the forward 37° channel except that the 0° and 37° crystals 14b, 14a of the rear wheel 14 are utilized, rather than the corresponding crystals of the forward wheel 12. For this reason, no particular explanation of this channel will be given.

0° channel

The 0° channel of FIG. 2 operates in conjunction with the 0° and 37° crystals 12b, 12a in the forward wheel 12 and with the 70° crystals 12c, 14c of both wheels. The 70° crystals are aligned, and the wheels are so spaced, that the ultrasonic beams from these crystals traverse the head 10a of the rail 10, meeting at the juncture of head and web. Each 0° crystal, of course, directs the ultrasonic beam vertically downward through the web 10b of the rail 10 to its base.

In many respects, the 0° channel operates in a manner similar to the two 37° channels. However, there are important differences, as will now be explained.

The first difference is that pulser 32 is energized from the "delay" timing pulses from rate generator 18. These delayed pulses occur approximately 500 microseconds after the main timing pulses. This prevents troublesome "crosstalk" between the 37° and 70° crystals.

The video counter 92 in the 0° channel is caused to count by different means than is employed in the 37° channels. In this channel, the gated signals from the forward 37° crystal 12a are amplified and then passed to the high gain rail noise amplifier 50. Signals from the 70° crystals 12c, 14c passing through receiver 86 and gated amplifier 88 are also received by the rail noise amplifier 50. The rail noise amplifier 50 amplifies and inverts the negative gated video signals, sending them to the video driver 90 where they actuate the video counter 92.

The two methods of resetting the video counter 92, described in relation to the forward 37° channel, also apply to the 0° channel. As will be remembered, these are: (1) The video counter 92 is reset whenever the count on the storage control counter 104 reaches the preselected pickoff cathode; (2) The video counter 92 is reset whenever the alarm counter 96 is actuated. The 0° channel, however, also has an additional method for resetting the video counter 92. Every time a bottom signal from the base of the rail is received by the 0° crystal 12b, the double pulser 28 produces a signal (b) which occurs at delayed pulse time. Signal (b) is applied directly to the amplifier-inverter 98 which thereupon resets the video counter 92.

A number of different conditions besides a fault can cause a loss of bottom signals. For example, grease, leaves, and other surface conditions can cause such a loss. The 0° channel distinguishes between such conditions and a defect. This is accomplished by employing signals created by rail noise to set the "theshold" amplitude for signals that are passed to the video driver 90. In order for the video counter 92 to be activated, there must be a combination of: (1) a signal greater than the rail noise signals; and (2) loss of bottom signal. When this combination of conditions persists over a preselected length of rail, the video counter 92 actuates the alarm 82.

In setting up the 0° channel for an actual test, the gain of the rail noise amplifier 50 is adjusted until the video counter 92 is on the threshold of counting. Any ultrasonic signal above the rail noise level will then cause counting. Since the rail noise signals are quite small, one tenth the amplitude of signals counted by the 37° channels, the 37° crystal 12a is able to detect echo signals even from horizontal defects.

One rail defect which has been difficult to detect heretofore is a head and web separation beneath a "battered" end which interferes with coupling into the rail. This defect is detected by the present invention. When the forward wheel 12 first rolls onto a new rail, there will be no bottom signal because of insufficient coupling due to rail end batter. The 70° crystal 14c in the rear wheel 14 will begin to develop a counting signal from rail end reflection. Then, when the front wheel 12 once more makes ultrasonic contact with the rail surface, the count will continue, due to echo signals from the defect received by the 37° and 70° crystals 12a, 12c in the forward wheel 12, combined with loss of bottom signals at the 0° crystal 12b as a result of the defect. If the defect is long enough, an alarm will occur.

The foregoing has described the basic operation of the system of this invention. We will now proceed to describe the operation and construction of certain of the component parts of the system in more detail.

Storage

After the apparatus of the invention has counted a bolt hole and there is no defect present, it is necessary to reset the video counter back to "0." Otherwise, the counts on each hole will add so that the system would alarm at almost every rail joint. There is also a problem arising from defects which lie in the rail at such an angle as to prevent strong signals from returning after each pulse from the rate generator. When this happens, the counter will count sporadically. Accordingly, it is important to distinguish between a hole and a crack which appears discontinuous to the detection system.

One method of accomplishing this is to store the video count for a short period and then reset the video counter after it has been ascertained that no defect is present. The storage control counter is used for this purpose. This counter is actuated by each rate generator pulse and is reset whenever a video pulse arrives from the rail. The circuits for accomplishing this have been described in the preceding section. The application of these circuits in specific situations will now be explained.

It may first be assumed that echoes are received from a bond pin hole which causes the video counter 66 to count. There is no defect present. With each pulse from the rate generator 18, the storage control counter 60 advances one cathode. A short time later, but before the next rate generator pulse, a video pulse will be received from the hole. This causes the video counter 66 to advance one cathode and the storage control counter 60 to be reset to "0." This sequence continues until the hole is out of the ultrasonic beam. If it is assumed that three video pulses are returned from the bond hole, the glow will be on the first or second cathode of the video counter 66, depending on the "evens" or "odds" position of the selector switch 74, and on the "0" cathode of the storage control counter 60. When the fourth pulse is received from the rate generator 18, the storage control counter 60 will once more count to the first cathode and, since no video signal is received, this counter will not be reset. The video counter glow will then stay at the same cathode. The same thing happens for the fifth pulse of the rate generator 18—the storage control counter 60 stepping to the second cathode while the video count remains fixed. When the sixth pulse is received from the rate generator 18, however, the storage control counter 60 is advanced to the third cathode and, if the storage switch is on this cathode, the output pulse is sent to the amplifier-inverter 62 and the video counter 66 is reset. Since the count is reset, no false alarm can result because of cumulative bolt holes.

Assume now that a "stutter crack," a crack providing a discontinuous echo, is being detected. On such a crack, the video counter 66 may count for two or three pulses, then miss the next one or two pulses, then pick up video signals once again and count a few more pulses. Obviously, it is not desirable to reset the video counter 66 during these periods of interruption. Assume that the storage switch is on the third cathode of the storage control counter 60. Assume further that a bolt hole has been counted and the system has now started to count a crack which emanates therefrom. There will be a count on the video counter 66 which is below the alarm level and the storage control counter 60 is on the "0" cathode. During the next pulse from the rate generator 18, no video signal is received so that the storage control counter 60 advances to the first cathode and the video counter 66 does not count. On the next rate generator pulse, the storage control counter 60 will advance to the second cathode and, if echo signals from the crack are once more picked up, the video counter 66 steps to the next cathode and the storage control counter 60 is reset. It will thus be apparent that, if the storage switch of the storage control counter 60 is on the third cathode, it is possible to miss a video signal for one pulse of the rate generator 18 without resetting the video counter 66. The number of video pulses which can be missed in this manner is controllable by adjusting the setting of the storage switch.

Under normal conditions, where only a few bond pin holes are expected in the web of a rail, the storage of the 37° channels may be set as high as possible without causing false alarms on the system. On the other hand, if many bond pin clusters are expected in the web, the storage must be low in order to enable the system to reset between these discontinuities in the steel.

In the 0° channel, the video counter 92 is reset whenever a bottom signal is present. For this reason, the storage in the 0° channel is set as high as possible in order that the video counter 92 will continue to count sporadic video pulses when combined with an absence of bottom signals.

*Automatic storage*

The storage mode selector switch 54 is connected so that the storage control driver 52 of the 37° channel may be energized either directly from the rate generator 18, as has been explained, or from the double pulser circuit 28. The latter mode is employed for most rail conditions. The double pulser circuit 28 is energized from the 0° crystal 12b whenever a bottom signal is generated. Of the two pulses produced, the second (b) serves to actuate the storage driver 52 so as to advance the storage control counter 60 in the fashion previously described. However, in the absence of a bottom signal, the (b) pulse is not produced by double pulser 28, the storage control counter 60 will not be advanced and, therefore, any count stored in the video counter 66 will not be disturbed. As long as this loss of bottom signal persists, the video signals will remain stored indefinitely.

Automatic storage would not normally be employed in the testing of rails having extreme curve wear. Under these circumstances, fixed storage of the type previously explained would be preferred.

*Signal generation*

Let us now consider the manner in which the signals are generated for use by the counter circuits with particular reference to FIG. 3 by way of example. All signals start with the rate generator 18 which, in turn, is controlled by the tachometer generator 16 so as to produce signals at a rate corresponding to the speed of the car. The signals from the rate generator 18 pass to the pulser 26 which is caused to generate a short pulse of approximately $-125$ to $-130$ volts to the crystal 12a in the wheel 12. The crystal generates ultrasonic vibrations which are transmitted through the wheel and into the rail. Upon being reflected back to the crystal, the vibrations are changed back into electrical energy in the form of damped wave trains of very low amplitude. The low amplitude signals are amplified by the receiver 40 and changed into positive video signals. The positive video signals are passed to the gated amplifier 38 which amplifies and passes those signals which occur during the 37° gate period and, at the same time, reverses them so that the output signals are negative. This output contains all the very small noise signals as well as any larger signals which may be present. The output from the gated amplifier 38 is passed through a compensated reject state 44 which inverts the signals to positive video signals and rejects all the smaller noise signals. Only the larger signals appear at the output of the circuit.

The positive video signals (a) from the compensated reject circuit 44 are passed to the double pulser 28 where they are correlated with the video signals received through receiver 34 from the 0° crystal 12b. If there is a large 37° gated signal and a loss of bottom during the same rate generator period, the 37° video signal (a) and another positive pulse (b), occurring at delayed timing pulse time, are sent to the video counter driver 64 to actuate video counter 66. This is a "double pulse" and the 37° video counter 66 will count twice during this period. If a bottom signal is received by the 0° crystal 12b, however, only the 37° video signal (a) is sent to the video counter 66. Accordingly, the system is twice as sensitive to a defect signal combined with loss of bottom signal as it is to a defect signal alone. Even when the bottom signal is received, however, the pulse (b) is passed to the terminal 58 of switch 54 and to the amplifier-inverter 98 (FIG. 2).

*Double pulser circuit*

In FIG. 11 there is illustrated a block diagram of the double pulser circuits 28, 28'. Each of these circuits includes a one shot multivibrator 281 which receives the interface signal produced by the interface circuit 36. The output of multivibrator 281 is a negative square pulse which starts at the interface time and has a variable width controlled by a gate start control 282. This variable width pulse is supplied to a differentiating and clipping circuit 283 which clips off the negative step and differentiates the positive step into a positive spike. It will thus be apparent that the time interval between the first interface signal received by the multivibrator 281 and the spike signal produced by the differentiating and clipping circuit 283 is adjustable by the gate start control 282. The positive spike produced by circuit 283 is supplied to another one shot multivibrator 284 which generates a fixed width square gating signal beginning at the time of its input pulse. This square wave, in turn, is applied to And circuit 285. The second input to the And circuit 285 is the 0° video signal received from receiver 34. Since the timing of the 0° gate is set to include echo signals received from the bottom of the tested rail, the And circuit 285 will receive two inputs whenever an actual bottom echo is transmitted from receiver 34. The negative spike produced by the And circuit 285 is supplied to a 0° "loss of bottom" flip-flop circuit 286. If this negative spike is large enough, it produces a negative transition in the output of flip-flop 286 known as the "bottom transition." If the output of And circuit 285 is either non-existent or very small, this indicates either a complete loss of bottom or a very small bottom signal. Under these circumstances, there is no transition in the output of flip-flop 286 so that its output remains positive.

Assuming that a bottom signal is received so that the negative transition in the output of flip-flop 286 occurs, this transition is supplied to the 0° reset clamp circuit 287, and to the double pulse And circuit 288. The output of the And circuit 288 is supplied to the second pulse clamp circuit 289. If the output of And circuit 288 is a negative step, the second pulse clamp circuit 289 will allow a positive pulse which occurs later in time to be passed therethrough. Such a pulse, which we may refer to as pulse ($b$), would then be added to the pulse ($a$) which is received by the double pulser circuit 28 from the compensator reject circuit 44. However, if the output of the And circuit 288 remains positive, the second pulse clamp circuit 289 shorts its input to ground so that pulse ($b$) will not pass through. This is the case when there is no 37° gated video signal or when there is a bottom signal.

The positive input pulse supplied to the second pulse clamp 289 and to the 0° reset clamp is the delayed timing pulse produced by rate generator 18 which is reduced to a safe voltage level by means of the limiter and cathode follower circuit 290.

Whenever a 37° gated video signal ($a$) enters the double pulser circuit 28, it bypasses all circuitry and is supplied by the double pulser circuit 28 to the video driver 64. The same 37° gated video signal, however, is also sent to a 37° pickoff stage 291 which has controllable sensitivity. The output of the pickoff stage 291 is a negative pulse whose amplitude is dependent upon the selected setting of the pickoff stage 291 and to the amplitude of the input video signal ($a$). This negative pulse is supplied to the 37° flip-flop circuit 292 where, if it is large enough, it produces a positive transition in the output of the flip-flop circuit which is supplied to And circuit 288.

The And circuit 288 is designed in such a manner that if the outputs from loss of bottom flip-flop 286 and the 37° flip-flop 292 are both positive, a negative transition is produced at its output. This negative transition would come at the same time as the 37° video signal ($a$). On the other hand, if either of the input transitions to And circuit 288 are negative, the output of circuit 288 would remain positive. It will thus be seen that the only condition which would allow the outputs of flip-flop 286 and flip-flop 292 to both be positive would occur when there is a loss of bottom signal combined with receipt of a 37° gated video signal ($a$).

The 0° reset clamp 287 allows a positive pulse ($b$) to pass through it only when there is a bottom signal. This pulse is supplied to the amplifier-inverter circuit 98 where it serves to rest the 0° video counter 92 whenever a bottom signal is present. When there is a loss of bottom, however, the positive pulse is clamped to ground by the 0° reset clamp so that the 0° video counter 92 is free to count.

It will be noted that the output of the double pulse And circuit 288 is a negative step which occurs either at the time a bottom echo signal is received or at the time of receipt of a 37° gated video signal ($a$), whichever comes last. Before this negative step occurs, the second pulse clamp circuit 289 would not permit the delayed pulse from the limiter 290 to pass. However, when the negative transition does occur, the delayed pulse ($b$), which comes later in time than the pulse ($a$), is allowed to pass so that a double pulse is transmitted to the video driver 64, causing the counter 66 to count twice. If the conditions for double pulsing are not met, the double pulse And circuit 288 will not conduct so that the second or delayed pulse ($b$) will not be passed through the second pulse clamp 289.

Interface gating circuit

If the search wheel should bounce during the high speed testing envisaged by this invention, the distance between the crystals and the rail surface would change. The similar interface gating circuits 36 and 36' compensate for this. The interface circuit 36 receives the interface signal from the 0° crystal 12$b$ and transmits it to the gated amplifiers.

The interface circuit 36 is shown in block diagram form in FIG. 6. The function of this circuit is to provide a synchronizing signal at first interface time. This interface synchronizing signal is then sent to the gated amplifiers 38, 38', 42, 42', and 88 for the purpose of initiating interface gates. A 12 volt main synchronizing signal is sent from the rate generator 18 to the lockout one shot 361, a monostable multivibrator which produces a positive square pulse. The width of this pulse is controlled by a lockout potentiometer which is not shown. This positive square pulse terminates 10 to 15 microseconds before the first interface signal received by the 0° crystal 12$b$. The duration of the pulse is called the "lockout time." This pulse is sent to the And circuit 362 where it combines with the 0° video output from receiver 34. The And circuit 362 is such that it will produce an output upon receiving the next large video signal occurring after lockout time. It is desired that this next large signal be the echo from the first interface. This, then, causes a negative spike to appear at the output of the And circuit at the first interface time. This negative spike from the And circuit is fed to the flip-flop 363 which will fire if the incoming spike is of great enough amplitude. The output of the flip-flop 363 is a negative square wave which starts at main sync time and ends at first interface time. The positive transition comes at first interface time and is used for the interface gating signal.

Hold-off logic

Figure 10:
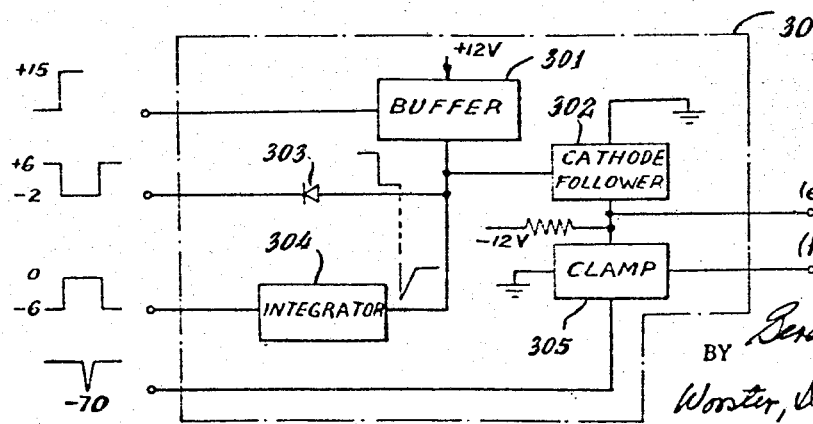
FIG. 10 is a block diagram of another element of the circuit of FIGS. 1–3.

FIG. 10 illustrates the block diagram of the hold-off logic circuit 30 employed in both the forward 37° channel and the rear 37° channel. The input to the hold-off logic circuit 30, which originates with the storage cathode of the storage control counter 60, is supplied to a buffer or Darlington circuit 301 which is normally biased closed. This input signal is from the ninth cathode of the storage control counter and is a positive 15 volt signal which will last for the duration of the pulse period, provided no video signals are counted. The signal opens the buffer stage 301, thereby changing the input to the cathode follower 302. Cathode follower 302 is referenced to ground and to a negative 12 volt source. A negative gate signal from gated amplifier 38 is supplied to a diode 303 connected to the output of an integrator 304. The integrator is supplied by a positive gate signal from the gated amplifier 38. The combined outputs from the diode 303 and the integrator 304 provide a negative pulse output after the end of the test time. The resulting output from the emitter follower 302 is a signal that has a zero volt reference and will go to a positive 6 volt level when the counter tube is first energized, will then return to zero volt output when the gate signal starts, and will terminate some time after the end of the gate. This condition will then continue for the remainder of the pulse period. The same wave shape is impressed on a clamp transistor 305 which receives a negative 70 volt pulse from the delayed timing signals of line 22. This pulse is allowed to pass when the signal on the clamp 305 and the cathode follower 302 is positive. The output pulse appears as a negative 5 volt pulse during the hold-off time. The output signals (e) and (f) are indicated in FIG. 7.

*Automatic gain control*

In an actual rail testing operation, a number of different rail conditions must be met, and it would be desirable to change the gain of the receivers to compensate for different surface conditions. The distance amplitude correction (DAC) circuit 46 generates a distance amplitude correction signal which begins at the time of receipt of the first interface signal and changes the amplitude of the receiver. The receiver gain is thereby increased as signals are returned from deeper in the rail. The effect is to produce a linear output from the receiver. In addition, the automatic gain control circuit 48 adjusts receiver gain as a function of rail noise.

A block diagram of the automatic gain control circuit 48 used in this invention is shown in FIG. 7. This will be seen to comprise a reset amplifier 481 which receives gated video signals (b) from the gated amplifier 42 and main timing signals (a) from the rate generator 18. The output of the reset amplifier 481 feeds the cathode follower 482. The output of cathode follower 482 is bucked by the output of hold-off logic clamp 483. The resultant output from cathode follower 482 and the hold-off logic clamp 483 is applied to the comparator circuit 484, which is also arranged to receive a conditional reset signal (f) originating with a preselected cathode of the storage control counter 60. As has been described, this is the ninth cathode which, in the absence of a defect signal, will provide an output pulse at approximately 450 microseconds after the main timing signal from the rate generator 18. The output (d) of the comparator 484 is then fed through cathode follower 485. The output (g) of cathode follower 485 is the output signal from the automatic gain control circuit 48 which controls the gain of the receiver 40.

The basic circuit which is used in both the reset amplifier 481 and comparator 484 of the automatic gain circuit 48 is illustrated in FIG. 8. The operation of this basic circuit will now be described. The circuit comprises a diodes D1 and D2 and a capacitor C1. If a 12 volt pulse from the rate generator 18 were applied to diode D2, capacitor C1 would be charged to a maximum 12 volt level. After the pulse has terminated, C1 would then tend to discharge. However, only two paths are available for discharge purposes. One path would be through the back resistance or diode D2. This is approximately 20 megohms. The R-C time constant of C1 and D2 is relatively large so that, for all practical purposes, C1 would remain charged. The polarity of diode D1 is such that C1 would discharge through it. However, if we now assume that a 12 volt source is connected to the input of D1, no potential difference would exist between this 12 volt source and the voltage stored on C1. Accordingly, no curent would flow and the capacitor would remain charged.

If we now assume that a negative voltage pulse occurs at the input to D1 sometime after the main timing signal, it will be apparent that the 12 volt charge on C1 would drop to some new value. In the illustrated embodiment, we assume that this pulse is a negative 5 volt pulse, referenced from the positive 12 volt input, so that the voltage input to diode D1 drops to a positive 7 volts. For the period of time that the input pulse is at this amplitude, a potential difference will exist across D1. C1 will then immediately discharge down to this level, or to a positive 7 volts.

Referring back to FIG. 7, it will be noted that the signal to which C1 of reset amplifier 481 will discharge is the negative gated video (b) from the gated amplifier 42. The negative main timing signal (a) into the reset amplifier 481 is inverted so as to provide a positive 12 volt signal to D2. The amplitude of the output (c) of reset amplifier 481 would then be proportional to the amount of negative gated video signal at its input. This is indicated on the small time base diagram at the input to cathode follower 482.

If we temporarily disregard the hold-off logic clamp 483, which is connected to the cathode follower 482, the output of the cathode follower 482 would be identical with the input. The comparator circuit 484 is similar to the circuit of FIG. 8. Accordingly, the output (d) of the comparator circuit would be as illustrated by the time diagram over cathode follower 485. This is because the conditional reset input from storage control counter 60 and hold-off logic circuit 30 occurs at approximately delayed timing pulse time. Therefore, the level established by the comparator circuit 484 would extend from one pulse of the rate generator through the following gated video period. Accordingly, the output from cathode follower 485 to the receiver 40 would be positive and proportional to the rail noise level at the time of the previous rate generator pulse.

Let us now consider the operation of the hold-off logic clamp 483. The function of this clamp is to disable the output from cathode follower 482. Under normal conditions, this clamp is energized so as to maintain a positive 12 volt signal on the cathode follower 482 output. Accordingly, the comparator 484 cannot discharge into the cathode follower 482 and will retain whatever voltage level it had previously perceived from cathode follower 482 which was less than 12 volts. If the hold-off logic clamp 483 is deenergized during one rate generator pulse, however, the foregoing sequence of events would be reestablished. In other words, the normal output of cathode follower 482 would be perceived by the comparator 484 upon receiving the conditional reset pulse from the ninth cathode of storage control counter 60 at delayed sync time. This would then be the new intelligence supplied by the automatic gain control circuit 48.

Figure 9:
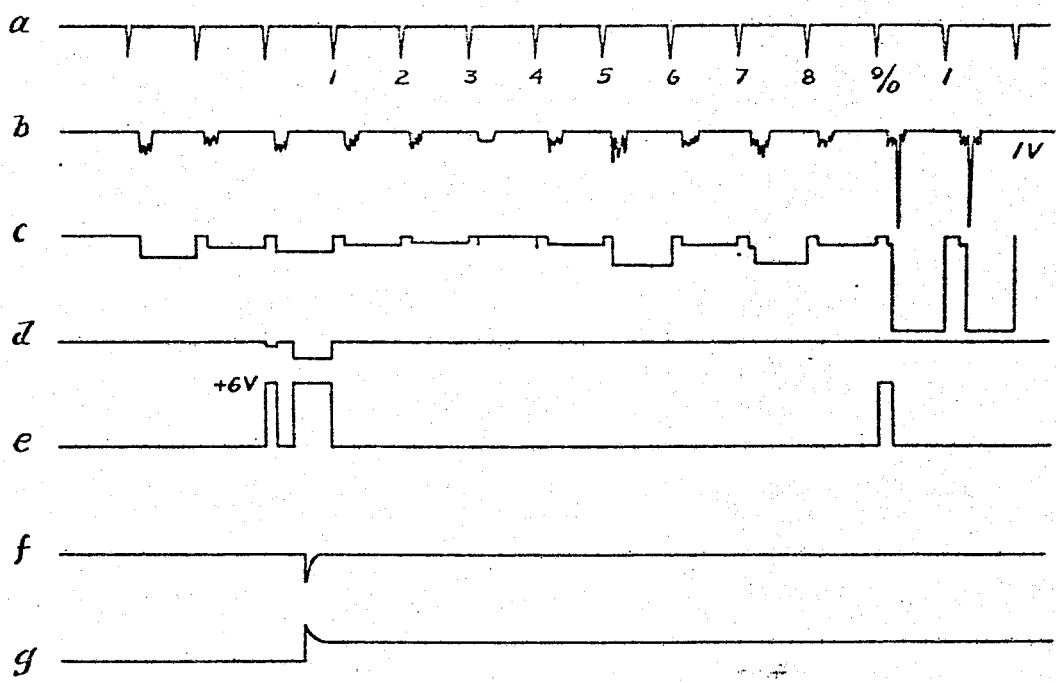
FIG. 9 is a diagram illustrating the operation of the circuit of FIG. 7.

Referring now to the wave form diagrams of FIG. 9, the time relationships between the various signals are indicated by the diagrams (a) through (g) which are correlated with the similar letters of FIG. 7. It will be noted that the negative variations in the output (c) of reset amplifier 481 are directly proportional to the gated video signals (b). However, this reset amplifier output will be applied to the comparator 484 only when a signal is received from the hold-off logic circuit as shown at (e). As has been explained, a hold-off logic signal will occur only at the time the ninth cathode of the storage control counter 60 is energized. The numbers appearing in diagram (e) indicate which cathode is energized. It will be noted that when the ninth cathode is energized, the hold-off logic signal (e) goes from zero volts to a positive six volts. At testing, or gate, time it returns to the zero volt level. The reason for this interruption in the hold-off logic output is to prevent the comparator circuit 484 from establishing a new level based upon the output of the reset amplifier 481 during the test time. At the end of the test time, plus a small fixed delay to allow the video counter 66 to energize, the hold-off logic voltage level returns to positive six volts so that the reset amplifier 481 can be read. If this level were lower when the six volt level returned, then the output of the comparator circuit 484 would drop immediately to the new level. On the other hand, if the reset amplifier indicated a higher level than previously, there would be no effect on the comparator output until the conditional reset pulse (f) charged the capacitor C1 back up to the positive 12 volt level whereupon it could immediately discharge down to the new intelligence level. This is indicated at the right side of FIG. 9 following the main timing signal from rate generator 18 which energizes the ninth cathode of the storage control counter 60. It will be seen that, at this time, the hold-off logic signal (e) grows to positive six volts where it remains until gate time. However, during the gate, a large negative video signal occurs as shown in diagram (b) as a result of a defect. This would immediately cause the video counter 66 to count and would reset the storage control counter 60 from the ninth cathode to the zero cathode. Accordingly, the hold-off logic signal would terminate and the previous automatic gain control level would then continue throughout the defect counting sequence. The function of this circuitry, of course, is to cause the gain control of the receiver 40 to be automatically adjusted to differences in rail noise, while preventing the receiver from being disabled completely by having its gain adjusted downwardly upon the occurrence of a very large signal. An exemplary embodiment of this invention generates a pulse into the rail every 0.23 inch, the gain control being adjusted in accordance with the noise level occurring during the previous 2.3 inches (ten pulses). In the event of a signal of countable level being generated, an additional 2.3 inches of rail is required at the end of the counting sequence in order to establish the new automatic gain control level.

*Search unit orientation*

Up to this point, little has been said of the orientation of the two wheel search units which are utilized in this invention. However, it is believed that much of the significance of the orientation of the wheels and the crystals which they contain will have become apparent by the examples given in the foregoing description. One example, which has already been given, is the detection of a head and web separation beneath a battered end. Many other defects are also distinguishable by means of the present invention. It has been stated that the sonic paths of the two 70° crystals 12c, 14c, intersect at the fillet between the head 10a and the web 10b. Accordingly, any echo which may originate in this region can be detected by either transducer. Thus, the fact that coupling may be lost by one wheel will not prevent a defect echo from being received by the other.

As has been described above, the 0° channel of the present system utilizes the 0° crystal in the forward wheel, the 37° crystal in the forward wheel, and the 70° crystals of both wheels. One of the primary functions of the 0° channel is to locate head and web defects, i.e., horizontal separations between the head and the web and to detect horizontal split heads.

The forward 37° channel, which utilizes the 0° crystal and the 37° crystal of the forward wheel search unit, is particularly adapted to the detection of bolt hole cracks or other web cracks which occur perpendicular to the 37° ultrasonic path. An additional defect which this channel is well suited to detect is a crack which emanates from a bolt hole at a rail end in a direction which is generally parallel to the sonic path. This defect is easily detected by the 37° channel by means of a "carom shot" which is reflected off the rail end onto the defect. The rear 37° channel is substantially identical with the forward 37° channel and detects similar defects.

To very briefly summarize this invention, two ultrasonic search wheels are utilized to simultaneously inspect a single rail at a number of different angles. The results are combined and the alarm signals are counted so as to provide a completely automatic determination of the defect size and orientation. Furthermore, the system is capable of such performance at a variety of speeds up to approximately 15 miles per hour. Furthermore, the system operates with a minimum of gating within the rail so as not to obscure defects which, in the prior art systems, often fell within the gated regions. In the above described invention, no attempt has been made to describe the alarm and readout systems in detail. However, it will be apparent that any of a number of different systems may be used with the system of this invention. A tape presentation, for example, may be quite effective.

Another type of defect which was easily missed by prior art search units was a bolt hole crack in the receiving end of a new rail section. Such a crack could easily have been missed by the pulses from prior art search units. With the present system, however, the loss of bottom signal on the 0° crystal is coupled with an indication from the 37° crystal. The counter circuit thereupon counts twice as fast so that such partially obscured defects cause the system to alarm.

It will be obvious to those skilled in the art that, in an actual test car, the equipment and circuitry of this invention would be substantially duplicated so as to test two rails simultaneously. It will also be apparent that a number of variations and modifications may be made in this invention without departing from its spirit and scope. Accordingly, it is to be understood that the foregoing description is illustrative only, rather than limiting. This invention is limited only by the scope of the following claims.

What I claim as new and desired to secure by Letters Patent of the United States is:

1. An ultrasonic tester for testing a workpiece for defects, said tester including the combination of
   a search unit for scanning the workpiece,
   a pair of transducers in said search unit for being acoustically coupled to the workpiece during said scaning for transmitting beams of ultrasonic energy into said workpiece in two different directions and receiving echoes therefrom,
   trigger means coupled to the transducers for intermittently energizing said transducer whereby the ultrasonic energy is transmitted in the form of pulses,
   a counter coupled to one of said transducers for accumulating a count of the echoes received thereby,
   alarm means coupled to said counter for producing an indication when said count exceeds a preselected level, and
   a counter coupled to the other of said transducers for counting the echoes received thereby, said second counter being effective to remove the count accumulated in the first counter when the counter in the second count reaches a preselected level.

2. An ultrasonic tester for testing a workpiece for defects, said tester including the combination of
   a search unit for scanning across the workpiece,
   a pair of transducers in said search unit for being acoustically coupled to the workpiece during said scanning for transmitting beams of ultrasonic energy into said workpiece in two different directions and receiving echoes therefrom,
   trigger means coupled to the transducers for intermittently energizing said transducer whereby the ultrasonic energy is transmitted into the workpiece in the form of pulses,
   timing means coupled to the trigger means and responsive to the movement of the search unit relative to the workpiece, said timing means being effective to actuate the trigger means each time the search unit travels a predetermined distance across the workpiece whereby a pulse of ultrasonic energy occurs each time a predetermined volume of the workpiece is scanned,
   a first counter coupled to the first transducer for accumulating a count of the number of the pulse echoes received thereby,
   alarm means coupled to the first counter for producing an indication when said count exceeds a preselected level, and
   a second counter coupled to the second transducer for accumulating a count of the number of pulse echoes received thereby, said second counter being coupled to the first counter for removing the count accumulated therein whenever the count in the second counter reaches a preselected level.

3. An ultrasonic tester for testing a workpiece having a front surface and a back surface, said tester including the combination of 8. An ultrasonic tester for testing a workpiece for defects, said tester including the combination of
   a wheel search unit for rolling across a surface of the workpiece and being acoustically coupled thereto,
   trigger means coupled to the search unit for intermittently energizing said search unit whereby pulses of ultrasonic energy are transmitted into the workpiece, and
   timing means coupled to the trigger means and responsive to the movement of the search unit relative to the workpiece, said timing means being effective to actuate the trigger means each time the search unit travels a predetermined distance across the workpiece whereby a pulse of ultrasonic energy occurs each time a predetermined volume of the workpiece is scanned.

9. An ultrasonic tester for testing a workpiece for defects, said tester including the combination of
   an electro-acoustic transducer effective to radiate a pulse of ultrasonic energy in response to an electrical signal,
   a pulse generator coupled to the transducer and effective to cause pulses of ultrasonic energy to be transmitted into the workpiece, and
   scan means for moving the transducer relative to the workpiece whereby the transducer scans the workpiece,
   said pulse generator being responsive to the movement of the transducer relative to the workpiece and having a pulse repetition rate that is a direct, linear function of the velocity at which the workpiece is scanned.

10. An ultrasonic tester for testing a workpiece for defects, said tester including the combination of
    a search unit including transducer means,
    means coupled to the search unit for intermittently energizing said transducer means and transmitting pulses of ultrasonic energy into the workpiece,
    said search unit being effective to acoustically couple the transducer means to the workpiece for transmitting the pulses of ultrasonic energy into the workpiece, said transducer means being effective to produce electrical signals in response to echoes of the pulses reflected from within the workpiece,
    means coupled to the workpiece and responsive to the movement of the search unit relative to the workpiece, said last means being effective to actuate the second means each time the search unit scans a predetermined amount of the workpiece, and
    counter means coupled to the search unit and effective to count the electrical signals therefrom.

11. An ultrasonic tester for testing a workpiece for defects, said tester including the combination of
    a search unit including transducer means for being coupled to the workpiece,
    means coupled to the search unit for intermittently energizing said transducer means for transmitting pulses of ultrasonic energy into the workpiece, said transducer means being effective to produce electrical signals in response to echoes of said pulses reflected from within said workpiece, and
    means coupled to the transducer means and responsive to the electrical signals, said last means being effective to count said electrical signals in a first mode when the signals have an amplitude in a first range and in a second mode when the signals have an amplitude in a second range.

12. An ultrasonic tester for testing a workpiece for defects, said tester including the combination of
    a search unit including transducer means for being acoustically coupled to the workpiece, said transducer means being effective to transmit pulses of ultrasonic energy into the workpiece in response to trigger signals and produce video signals in response to ultrasonic energy reflected from the workpiece,
    scanning means coupled to the search unit to produce a scanning movement between the search unit and the workpiece,
    trigger means coupled to the scanning means and to the search unit for intermittently transferring a trigger signal to the transducer means each time the search unit travels a predetermined increment, and
    counting means coupled to the transducer means and responsive to the amplitude of the video signals, said counting means being effective to count in a first mode when the video signals have an amplitude in a first range and in a second mode when the video signals have an amplitude in a second range.

13. An ultrasonic tester for testing a workpiece having a front surface and a back surface, said tester including the combination of
    a first transducer adapted to transmit a first beam of ultrasonic energy through the workpiece to the back surface of the workpiece and to receive echoes of the energy reflected therefrom,
    first means coupled to the first transducer and effective to produce a first electrical signal only when an echo is received from the back side,
    a second transducer adapted to transmit a record beam of energy into the workpiece at an angle oblique to the first beam and to receive energy reflected from any discontinuities in said second beam,
    second means coupled to the second transducer and effective to produce a second electrical signal whenever an echo is received from a discontinuity, and
    third means coupled to the first and second means and responsive to the occurrence of said electrical signals, said third means being responsive in a first degree to the second signal when the first signal occurs and responsive in a second degree to the second signal when the first signal does not occur.

14. An ultrasonic tester for testing a workpiece having front and back surfaces, said tester including the combination of
    a pair of ultrasonic transducers for radiating pulses of ultrasonic energy through the front surface of said workpiece in two different directions, one of said transducers being positioned to radiate ultrasonic pulses in a first direction and to produce first electrical signals corresponding to the ultrasonic energy reflected from the back surface of the workpiece, the other of said transducers being positioned to radiate ultrasonic pulses in a second direction and to produce second electrical signals corresponding to the ultrasonic energy reflected from discontinuities in said second direction,
    a first channel coupled to the first transducer and responsive to the occurrence of the first electrical signals,
    a second channel coupled to the second transducer and responsive to the second electrical signals, and
    means coupled to said channels and responsive in a first degree to the second electrical signals when the first signals are occurring and responsive in a second degree to the second electrical signals when the first signals are not occurring.

15. An ultrasonic tester for testing a workpiece having a front surface and a back surface, said tester including the combination of
    a first transducer for transmitting a beam of ultrasonic energy through the workpiece to the back surface of the workpiece and to receive echoes of the energy reflected therefrom,
    a second transducer for transmitting a second beam of ultrasonic energy into the workpiece at an angle oblique to the first beam and to receive energy reflected from any discontinuities in said second beam,
    pulse means coupled to said transducers and effective to energize said transducers into transmitting pulses of ultrasonic energy, and a first channel coupled to the first transducer and effective to produce an electrical signal corresponding to the echo from the back side of said workpiece, a second channel coupled to the second transducer and effective to produce an electrical pulse each time an echo is received from a discontinuity disposed in said second beam, and a counter coupled to both of said channels and effective to count at a first rate each time an electrical pulse occurs in synchronism with the first electrical signal and at a second rate each time an electrical pulse occurs in the absence of the first electrical signal.

16. An ultrasonic tester for testing a workpiece having front and back surfaces, said tester including the combination of a first transducer for transmitting a first beam of ultrasonic energy through the workpiece and receiving echoes of the energy reflected from the back surface, a second transducer for transmitting a second beam of ultrasonic energy into the workpiece at an oblique angle to the first beam and receiving echoes of the energy reflected from any discontinuities in said second beam, the magnitude of said echo being in a relatively strong range when said discontinuity is oriented in a first manner to the second beam and in a relatively weak range when said discontinuity is oriented in a second manner to the second beam, a first channel coupled to the first transducer and effective to produce an electrical signal corresponding to the echoes from the back surface of said workpiece, a second channel coupled to the second transducer and effective to produce an electrical signal corresponding to the echo from a discontinuity in the second beam, said second electrical signal having an amplitude in a high range when the discontinuity is oriented in the first manner and said echo is strong, said second electrical signal having an amplitude in a low range when the discontinuity is oriented in a second manner, means coupled to said channels and responsive to the occurrence of the first signal and the amplitude of said electrical pulse signal, said means being effective to indicate a discontinuity when there is no first electrical signal and there is a second electrical signal with an amplitude in the low range corresponding to an echo produced by a discontinuity oriented in said second manner.

17. An ultrasonic tester for testing a workpiece having front and back surfaces, said tester including the combination of a first transducer for transmitting pulses of ultrasonic energy in a first beam through the workpiece and receiving echoes reflected from the back surface, a second transducer for transmitting pulses of ultrasonic energy in a second beam into the workpiece at an oblique angle to the first beam and receiving echoes of the energy reflected from any discontinuities in said second beam, the magnitude of said echo being in a relatively strong range when said discontinuity is oriented in a first manner to the second beam and in a relatively weak range when said discontinuity is oriented in a second manner to the second beam, pulse means coupled to said transducers for causing said transducers to transmit their respective pulses in synchronism with each other, a first channel coupled to the first transducer and effective to produce an electrical signal corresponding to the echoes from the back surface of said workpiece, a second channel coupled to the second transducer and effective to produce electrical pulses corresponding to the echo from a discontinuity in the second beam, the amplitudes of said electrical pulses being in a high range when the discontinuity is oriented in the first manner and said echo is strong and in a low range when the discontinuity is oriented in the second manner and said echo is weak, and a counter coupled to said channels and responsive to the occurrence of the electrical signal and the amplitude of said electrical pulses, said means being effective to count the electrical pulses when the electrical pulses have a small amplitude and there is no electrical signal.

18. An ultrasonic tester for testing a workpiece having front and back surfaces, said tester including the combination of a transducer for transmitting ultrasonic energy into the workpiece and receiving echoes of the energy reflected from the internal structure of the workpiece and from any discontinuities in said workpiece, the magnitude of said echo being in a relatively large range when said discontinuity is oriented in a first manner and in a relatively small range when said discontinuity is oriented in a second manner, the small range being just in excess of the echoes from the internal structure of the workpiece, amplifying means coupled to the transducer and effective to produce an electrical signal having an amplitude corresponding to the magnitude of the echo received thereby, and means coupled to said amplifying means and responsive to the electrical signal and effective to indicate a discontinuity only when the amplitude of the electrical signal corresponds to an echo just greater than the noise echoes.

19. An ultrasonic tester for testing a workpiece having a front surface and a back surface, said tester including the combination of a first transducer for transmitting a beam of ultrasonic energy into the workpiece at an oblique angle to the surface of the workpiece and receiving echoes of the energy reflected from any discontinuities in said beam, means coupled to the transducer and effective to produce a video signal having an amplitude in a strong range whenever the beam is incident upon a discontinuity oriented within a first range of angles and having an amplitude in a weak range whenever the beam is incident upon a discontinuity oriented within a second range of angles, a second transducer for transmitting a second beam of ultrasonic energy through the workpiece and receiving echoes of the energy reflected from a back surface, scan means coupled to said transducer and effective to move the transducers relative to the workpiece, means coupled to the transducers and to the scan means to energize the transducers each time they scan a predetermined increment, second means coupled to the second transducer and effective to provide an electrical signal corresponding to an echo reflected from the back surface of the workpiece corresponding to a discontinuity in the second beam, and output means coupled to said first and second means and effective to indicate a discontinuity when the amplitude of the video signal is in weak range and there is not a second signal.

20. An ultrasonic tester for testing a workpiece having a front surface and a back surface, said tester including the combination of a first transducer adapted to transmit a first beam of ultrasonic energy through the workpiece to the back surface of the workpiece and to receive echoes of the energy reflected therefrom, first means coupled to the first transducer and effective to produce a first electrical signal only when an echo is received from the back side, a second transducer adapted to transmit a second beam of energy into the workpiece at an angle oblique to the first beam and to receive energy reflected from any discontinuities in said second beam, amplifying means coupled to the second transducer and effective to produce a second electrical signal whenever an echo is received from a discontinuity, automatic gain control means coupled to the first and second means and responsive to the amplitude of said electrical signals for varying the gain of said amplifying means in response thereto, and means responsive to the echoes and effective to disable the automatic gain control when the first transducer does not receive an echo and when the second transducer does receive an echo.

21. An ultrasonic tester for testing a workpiece for defects, said tester including the combination of means effective to transmit pulses of ultrasonic energy into a workpiece and to receive echoes of said energy reflected from within said workpiece, counter means to count the number of echoes received from the workpiece, said counter means including means effective to clear the count in the counter means whenever a predetermined number of consecutive pulses are transmitted by the first means without echoes being received by the first means, and utilizing means coupled to said counter means and effective to produce an indication whenever the accumulated count exceeds a predetermined level.

22. An ultrasonic tester for testing a workpiece for defects, said tester including the combination of means effective to transmit pulses of ultrasonic energy into the workpiece in two different directions and to receive echoes of said energy reflected from said different directions, a first counter coupled to said first means for accumulating a count of the echoes received from one of said directions, means coupled to said first counter and effective to produce an indication whenever the accumulated count exceeds a preselected amount, and a second counter coupled to said first means for accumulating a count of the echoes received from the other direction, said second counter being effective to remove the count from the first counter whenever the second count accumulated therein exceeds a preset level.

23. An ultrasonic tester for testing a workpiece for defects, said tester including the combination of transducer means effective to transmit pulses of ultrasonic energy into the workpiece and receive chos of said pulses from within said workpiece, counter means coupled to said transducer means and responsive to the echoes received by said first means, said counter means being effective to count the echoes and to accumulate a count which is a function of the number of echoes returned, and means coupled to the transducer means and responsive to the ultrasonic energy received from said workpiece, said last means being effective to cause the counter to count the received echoes at a first rate or at a second rate in response to the ultrasonic energy received from the workpiece.

24. An ultrasonic tester for testing a workpiece for defects, said tester including the combination of transducer means effective to transmit ultrasonic energy into the workpiece and to receive echoes of said energy from any defects within said workpiece, receiving means coupled to said transducer means and responsive to the echoes received by said first means, said receiving means being effective to the echoes in a first or second degree to indicate the size of said defect, and means coupled to the transducer means and responsive to the ultrasonic energy received from said workpiece, said last means being effective to cause the receiver means to respond in the first degree or the second degree in response to the received echoes.

25. An ultrasonic tester for testing a workpiece, said tester including the combination of transducer means adapted to transmit pulses of ultrasonic energy into the workpiece and to receive echoes of the energy reflected therefrom, amplifying means coupled to the transducer means and effective to produce an electrical signal only when an echo is received, automatic gain control means coupled to the amplifying means and effective to vary the gain thereof to vary the relation between the echo and said first electrical signal, and means coupled to the automatic gain control means and to the transducer means, said last means being responsive to the receiving of an echo and effective to disable the automatic gain control whereby the gain remains constant during the reception of an echo.

References Cited

UNITED STATES PATENTS

| | | | |
|---|---|---|---|
| 2,875,607 | 3/1959 | Boxcer et al. | 73—67.9 |
| 3,041,872 | 7/1962 | Brown et al. | 73—67.9 |
| 3,135,109 | 6/1964 | Werner | 73—67.8 |
| 3,233,450 | 2/1966 | Fry | 73—67.8 |
| 3,251,220 | 5/1966 | Joy | 73—67.7 |
| 3,260,105 | 7/1966 | McNulty | 73—67.9 |
| 3,048,031 | 8/1962 | Beaujard et al. | 73—67.9 XR |
| 3,287,963 | 11/1966 | Stanya et al. | 73—67.9 |

FOREIGN PATENTS 933,564   8/1963   Great Britain.

JAMES J. GILL, *Primary Examiner.*

U.S. Cl. X.R.

73—71.5